United States Patent
Portisch

(10) Patent No.: US 10,727,753 B2
(45) Date of Patent: Jul. 28, 2020

(54) BIDIRECTIONAL FLYBACK CONVERTER CIRCUIT

(71) Applicant: SIEMENS AKTIENGESELLSCHAFT, Munich (DE)

(72) Inventor: Daniel Portisch, Mistelbach (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/269,298

(22) Filed: Feb. 6, 2019

(65) Prior Publication Data

US 2019/0245452 A1 Aug. 8, 2019

(30) Foreign Application Priority Data

Feb. 7, 2018 (EP) .................................. 18155469

(51) Int. Cl.
*H02M 3/335* (2006.01)
*H02M 1/34* (2007.01)

(52) U.S. Cl.
CPC ........ *H02M 3/33584* (2013.01); *H02M 3/335* (2013.01); *H02M 2001/342* (2013.01)

(58) Field of Classification Search
CPC ...... H02M 3/28; H02M 3/33584; H02M 1/34; H02M 2001/342
See application file for complete search history.

(56) References Cited

U.S. PATENT DOCUMENTS

| | | | | |
|---|---|---|---|---|
| 6,087,802 A * | 7/2000 | James | ..................... | H02J 7/022 320/104 |
| 9,380,655 B2 * | 6/2016 | Levy | ................... | H05B 33/0815 |
| 9,647,563 B1 | 5/2017 | Whitaker | | |
| 2008/0043498 A1 | 2/2008 | Etheridge | | |
| 2016/0099647 A1 * | 4/2016 | Zhang | ................ | H02M 3/33569 363/21.12 |

FOREIGN PATENT DOCUMENTS

KR 1010 43 402 6/2011

OTHER PUBLICATIONS

European Search Report issued in corresponding EP Appln. No. 18155469.2.

* cited by examiner

*Primary Examiner* — Yemane Mehari
(74) *Attorney, Agent, or Firm* — Cozen O'Connor

(57) ABSTRACT

A bidirectional flyback converter circuit includes a transformer with inductively coupled primary and secondary windings, primary-side and secondary-side switching elements, wherein the primary winding and secondary windings are respectively connected to a voltage input and output, where the primary-side and secondary-side switching elements are respectively arranged in series with the primary and secondary windings, where a charge capacitor is connected via a first terminal to a common potential of the primary and secondary sides, where with a second terminal, the charge capacitor is connected via a first diode to a common potential of the primary-side switching element and primary winding and via a second diode to a common potential of the secondary-side switching element and secondary winding, and where a buck converter is arranged on the input or output side, through which a voltage present at the charge capacitor can be regulated to a predeterminable value.

10 Claims, 1 Drawing Sheet

BIDIRECTIONAL FLYBACK CONVERTER CIRCUIT

BACKGROUND OF THE INVENTION

1. Field of the Invention

The present invention relates in general to the field of electrical engineering, in particular to the area of power electronics and also power electronics circuits. Specifically the present invention relates to a bidirectional flyback converter circuit, which comprises a transformer with inductively coupled primary and secondary windings, a primary-side switching element and a secondary-side switching element, where the primary winding is connected to a voltage input of the flyback converter circuit and the primary-side switching element is arranged in series with the primary winding, and where the secondary winding is connected to a voltage output of the flyback converter circuit and the secondary-side switching element is arranged in series with the secondary winding.

2. Description of the Related Art

What is known as a flyback converter represents a version of a switched-mode power supply, with which electrical loads can be connected to a power network or to a power source. In particular, a flyback converter serves to transmit electrical energy between a voltage input or a primary side and a voltage output or a secondary side of mostly galvanically separated DC voltages. To this end, during a flow phase, magnetic energy is stored by a current flowing through the primary winding of a transformer, which is emitted during a blocking phase, where necessary after rectification and smoothing, to a secondary-side connected load. For a switchover from the flow phase to the blocking phase or from the blocking phase to the flow phase, a switching element, which is arranged in series with the primary winding of the transformer, is switched by a control device, e.g., depending on the load.

A so-called bidirectional flyback converter or a so-called bidirectional flyback converter circuit represents a specific form of a flyback converter (as is known for example from publications WO 2003/003552 A2 and WO 2004/030193 A1). In this converter, the secondary-side diode of the flyback converter is usually replaced by a secondary-side switching element, which is arranged in series with the secondary winding of the transformer. In this way, the secondary side consists of a mirror image arrangement of the primary side in relation to the transformer.

A direction of the energy flow is defined by switching one of the two switching elements (primary or secondary-side), where the functionality corresponds to the functionality of a flyback converter. This means that, when the primary-side switching element is switched, energy will then be transmitted from the voltage input or from the input side of the bidirectional flyback converter circuit to the voltage output or to the output side of the bidirectional flyback converter circuit. Here, the secondary-side switching element works as a diode. When the secondary-side switching element is switched, the energy flow then reverses, i.e., from the voltage output to the voltage input and the primary-side switching element operates as a diode.

However, with flyback converters, such as bidirectional flyback converters, relatively high voltage loads occur in each case at the switching element switching off at the time during a switch-off process of the switching element bringing in the energy. This means that, when a switching element is switched off, this results in a demagnetization of stray inductances of the transformer at this switching element in overvoltages or voltage peaks. These overvoltages or voltage peaks can restrict the operability of the switching element just switching off in each case or can lead to damage at the switching element and the flyback converter circuit.

In order to prevent the corresponding damage caused by overvoltages and voltage peaks during switch-off at the respective switching element and/or at the flyback converter circuit, Metal-Oxide Semiconductor Field Effect Transistors or MOSFETs can be used as switching elements, for example. MOSFETs have a far higher reverse voltage or a current strength that is so high that the overvoltage arising does not represent any danger. However, these MOSFETs also have a higher on-state resistance and thus higher losses. As well as higher costs and a low efficiency as a result of energy losses (e.g., waste heat) of MOSFETs with higher reverse voltage or current strength, the use of these types of MOSFETs as switching elements also has the disadvantage that for example through-hole-mounted MOSFETs, i.e., "Through Hole Technology" (THT-MOSFETs), and also additional heat sinks must be provided or when Surface-Mounted-Device (SMD) MOSFETs are used, these must be mounted on an additional printed board surface.

As an alternative or in combination with the use of power MOSFETs as switching elements, in order to limit the overvoltages or voltage peaks arising through the stray inductances of the transformer, a "snubber network" can be provided for each switching element of the bidirectional flyback converters for example. The respective snubber network can be arranged in parallel to the respective switching element, for example. When the respective switching element is switched off, the surplus energy from the stray inductances of the transformer is conveyed into the snubber network and dissipated during the course of the switching period, where a certain amount of energy is usually converted into heat. In the simplest case, for example a capacitor or a Zener diode can be used as the snubber network. More complex snubber networks consist, for example, of capacitor and resistor (RC element) or capacitor, resistor and diode (RCD element). However, the use of a snubber network for each switching element leads, in addition to a complex design of the circuit, to high energy losses and thereby to a poor effectiveness or a lower efficiency of the bidirectional flyback converter.

KR 101043402 discloses an exemplary bidirectional flyback converter, in which a loading of the switching elements during switching processes, in particular during switching off, is reduced via an active clamping circuit. However, such a circuit has the disadvantage that, in particular with jumps in load, it can result in undesired oscillations through a resonant circuit from the transformer of the bidirectional flyback converter and from the capacitor of the active clamping circuit. This leads to restrictions in the duty cycle of the respective switching element.

In order to reduce the losses caused by the snubber networks of the switching elements or to increase the efficiency of the bidirectional flyback converter, a separate downwards converter, step-down converter or buck converter can be provided for each snubber network used for example, in order to make the stray energy, e.g. on the input side and output side of the bidirectional flyback converter, usable. However this has the disadvantage that a buck converter must be provided for each switching element with snubber network, which means that the circuit becomes complicated, relatively complex and high-cost in its realization and structure.

SUMMARY OF THE INVENTION

In view of the foregoing, it is therefore an object of the invention to provide a bidirectional flyback converter circuit, in which, in a simple and low-cost way, overvoltages or voltage loads at the switching elements caused by stray inductances can be limited and an effectiveness or an efficiency of the circuit can be improved.

This and other objects and advantages are achieved in accordance with the invention by a bidirectional flyback converter circuit comprising a transformer with inductively coupled primary and secondary windings, where the primary winding is connected to a voltage input of the bidirectional flyback converter circuit and the secondary winding is connected to a voltage output of the bidirectional flyback converter circuit. Furthermore, the bidirectional flyback converter circuit has a primary-side switching element that is arranged in series with the primary winding, and a secondary-side switching element that is arranged in series with the secondary winding. Furthermore, a charge capacitor and a buck converter are also provided. In this case, the charge capacitor is connected by a first terminal to a common potential of the primary and secondary sides of the bidirectional flyback converter circuit. By a second terminal, the charge capacitor is connected via a first diode to a common potential of the primary winding and primary-side switching element and via a second diode to a common potential of the secondary winding and secondary-side switching element. With the buck converter, which is arranged either on the input side or on the output side, a voltage present at the charge capacitor can be regulated to a predeterminable value.

The main aspect of the solution proposed in accordance with the invention consists of a snubber network being formed by the charge capacitor, the first and also the second diode, which can be used both for the energy flow from the voltage input to the voltage output of the bidirectional flyback converter circuit and also for an energy flow from the voltage output to the voltage input of the bidirectional flyback converter circuit to restrict the voltage losses at the respective switching element performing the switching. The buck converter arranged on the input or output side can likewise be used for both energy flow directions of the bidirectional flyback converter circuit, in order to discharge the charge capacitor or to regulate the voltage present at the charge capacitor to a predetermined value. This means that both the snubber network or the charge capacitor and also the buck converter can be used both for the primary-side switching element and also for the secondary-side switching element.

The inventive bidirectional flyback converter circuit thus represents a low-cost and simple flyback converter realization for restricting voltage loads or overvoltages caused by stray inductances of the transformer at the switching elements. Energy losses through this restriction are reduced in a simple way through the use of the buck converter arranged on the input or the output side and thus the overall efficiency of the circuit or of the bidirectional flyback converter circuit is increased. The buck converter arranged on the input or the output side enables the stray energy during switching off of one of the two switching elements of the bidirectional flyback converter circuit to be reused in a very simple manner, for example, by feeding it back in on the voltage input side or on the voltage output side of the bidirectional flyback converter circuit. Furthermore, low-cost switching elements with a smaller reverse voltage can be used and complicated cooling measures can be dispensed with.

In an expedient embodiment of the invention, the predeterminable value for the voltage present at the charge capacitor is defined in a predeterminable ratio to the respective larger voltage value from the maximum input voltage and maximum output voltage of the bidirectional flyback converter circuit. This means that the predeterminable value of the voltage present at the charge capacitor is defined, for example, in a predeterminable ratio to the maximum input voltage of the bidirectional flyback converter circuit, if this is greater than the maximum output voltage of the bidirectional flyback converter circuit. For a maximum output voltage that is greater than the maximum input voltage of the bidirectional flyback converter circuit, ideally this is employed for determining the predeterminable value of the voltage present at the charge capacitor.

Ideally, the predeterminable value of the voltage present at the charge capacitor is at least twice the value of the respective larger voltage value from maximum input and maximum output voltage of the bidirectional flyback converter circuit. Ideally, this does not prevent operationally necessary voltage increases at the switching element, which arise because of the coupling by the transformer.

It is further advantageous for the primary-side switching element and also the secondary-side switching element to be formed as Metal-Oxide Semiconductor Field Effect Transistors or MOS-FETs. Ideally, MOS-FETs with a small switch-on resistance can be used (e.g., MOS-FETs with a drain voltage below 200V). A dimensioning of the switching elements or MOS-FETs is derived, for example, from the dimensioning of the charge capacitor and of the input-side or output-side buck converter, where the dimensioning the charge capacitor and of the buck converter depends on the respective larger voltage value from maximum input voltage and maximum output voltage of the bidirectional flyback converter circuit.

In a further expedient embodiment of the inventive flyback converter circuit, the buck converter arranged on the input side or output side comprises at least an inductance, a third diode and also a switching element. The buck converter arranged on the input side or output side advantageously acts as a controller (e.g., two-point controller, proportional controller, integral controller, differential controller or a combination of these controllers), through which the voltage present at the charge capacitor is regulated to a predeterminable value. Provided the voltage present at the charge capacitor has not yet reached the predeterminable value (e.g., on initial switching off of one of the two switching elements of the bidirectional flyback converter circuit), the switching element of the buck converter is switched off or not clocked. Only when the voltage present at the charge capacitor reaches the predeterminable value or is exceeded is the switching element of the buck converter clocked until such time as the predeterminable value of the voltage present at the charge capacitor is undershot or reached again. In this case, for example, the stray energy stored in the charge capacitor (depending on the arrangement of the buck converter) is fed back to the voltage input or to the voltage output of the bidirectional flyback converter circuit and can be used there accordingly.

The switching element of the buck converter can be formed ideally in this case as a Metal-Oxide Semiconductor Field Effect Transistor or MOS-FET or as a bipolar transistor or as an integrated component and can be activated via an appropriate controller. A MOS-FET belongs to the field effect transistors with insulated gate, which is controlled via a control voltage (gate source voltage). When a MOS-FET is used as the switching element of the buck converter either an N-channel MOS-FET (enhancement type) or a P-channel MOS-FET (depletion type) can be used. The use of a MOS-FET represents a simple and low-cost realization of the switching elements of the buck converter, where MOS-FETs can have a relatively high switching speed.

As an alternative, a bipolar transistor can be used for the switching element of the buck converter. A bipolar transistor is a type of transistor in which both charge carrier types (i.e., negatively charged electrons and positively charged electron holes) are used for current transport through the transistor. The bipolar transistor is activated via an electric current. Either an NPN transistor or a PNP transistor can be used as the switching element in the buck converter, where NPN or PNP specify the sequence and a doping type of the layering of the respective transistor.

As an alternative, it can be advantageous for the switching element of the buck converter to be realized via an integrated component. In such cases, a regulation, a driver and a switching functionality can be integrated in the integrated component and no additional activation has to be realized, as it does with the use of a MOS-FET or bipolar transistor as switching element in the buck converter.

It is useful for the primary-side and also the secondary-side switching elements of the bidirectional flyback converter as well as the switching element of the buck converter to be formed as gallium nitride based semiconductor switches. Semiconductor switches based on gallium nitride particularly allow higher switching frequencies and, when used in a switched-mode power supply, such as a flyback converter, can achieve a higher or better efficiency than usually used switching elements based on silicon for example.

In an expedient embodiment of the bidirectional flyback converter, surplus energy, which occurs at the buck converter arranged on the input side or output side is fed into a voltage other than an input voltage or output voltage of the flyback converter. This means that the surplus energy, which occurs at the input-side or output-side buck converter through a regulation of the voltage present at the charge capacitor to the predeterminable value, will ideally not be used to reduce the input or output voltage of the flyback converter, for example, but to feed in an auxiliary supply built up against the common potential of primary and secondary side for example (e.g., ground potential). This auxiliary supply can then, e.g., be used for supply of power to activation electronics, displays, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained below by way of an example, which refers to the enclosed figures. In the figures.

DETAILED DESCRIPTION OF THE EXEMPLARY EMBODIMENTS

Figure 1:
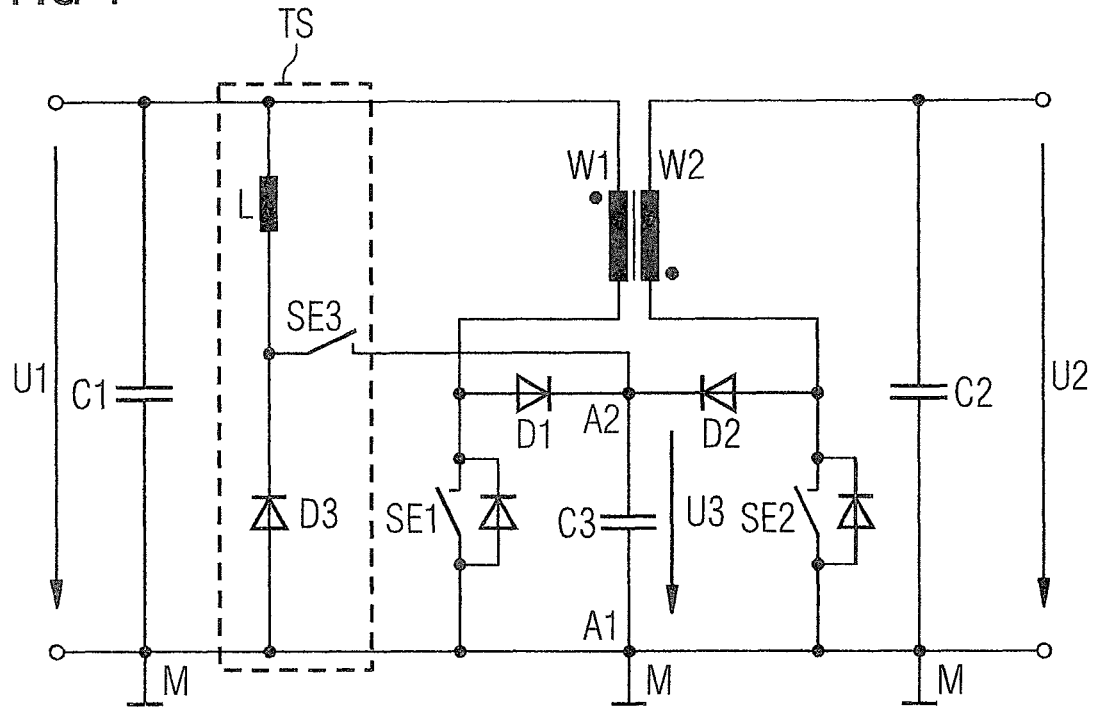
FIG. 1 is a schematic illustration of an exemplary bidirectional flyback converter circuit in accordance with an embodiment of the invention.

FIG. 1 shows a schematic and exemplary, bidirectional flyback converter circuit in accordance with an embodiment of the invention. The bidirectional flyback converter circuit has a transformer with a primary winding W1 and a secondary winding W2, which are inductively coupled and also wound diametrically opposed to one another. Here, the primary winding W1 is connected in this case in series with a primary-side switching element SE1 to a voltage input with an input voltage U1, where the input voltage U1 can lie in a range of 30 to 60 volts, for example. The secondary winding W2 is arranged in series with a secondary-side switching element SE2 and with a voltage output with an output voltage U2. MOS-FETs are used for the primary-side switching element SE1 and the secondary-side switching element SE2, for example. Furthermore, the primary side and secondary side or voltage input and voltage output have a common potential M, such as ground potential.

A direction of the flow of energy or power in the bidirectional flyback converter circuit is predetermined by the respective switching element SE1, SE2 that is switching. The respective switching element SE1, SE2 that is not switching then works as a diode. This means that, when for example, the primary-side switching element SE1 is being switched, energy or power will be transmitted by the bidirectional flyback converter energy from the voltage input to the voltage output. The secondary-side switching element SE2 works as a diode. An output capacitor C2 connected in parallel to the voltage output serves, for example, to smooth the transmitted energy or power. If on the other hand, e.g., the secondary-side switching element SE2 is being switched, then energy or power will be transmitted from the voltage output to the voltage input of the bidirectional flyback converter circuit and the primary-side switching element SE1 works as a diode. An input capacitor C1 can be provided at the voltage input, in order to smooth the energy or power transmitted from the voltage output.

Furthermore, a charge capacitor C3 is provided for the inventive, bidirectional flyback converter circuit. The charge capacitor C3 is connected via a first terminal A1 to the common potential M of the primary side and secondary side or the voltage input and voltage output. The charge capacitor C3 is connected by a second terminal A2 via a first diode D1 to a common potential of primary-side switching element SE1 and the primary winding and via a second diode D2 to a common potential of secondary-side switching element SE2 and the secondary winding.

Moreover, a buck converter TS is provided on the input side. The buck converter TS comprises at least one inductance L, a third diode D3 and a switching element SE3. The buck converter TS is connected via the switching element SE3 to the second terminal A2 of the charge capacitor C3 or to a voltage U3 present at the charge capacitor C3. The switching element SE3 of the buck converter TS can be embodied for example as a MOS-FET (e.g., N-channel or P-channel MOS-FET) or as a bipolar transistor (e.g., NPN or PNP transistor), where appropriate activation is to be provided for the switching element type or transistor type used.

As an alternative, an integrated component can also be used as the switching element SE3 of the buck converter TS, which already comprises an appropriate regulation as well as appropriate driver and switching element functionality.

With the buck converter TS, the voltage U3 present at the charge capacitor C3 can be regulated to a predeterminable value. This predeterminable value can be set in a predeterminable ratio to the greater respective voltage value from a maximum input voltage U1 and a maximum output voltage U2 of the bidirectional flyback converter circuit. In this case, the predeterminable value for the voltage U3 present at the charge capacitor C3 can be set to at least twice the value of the respective greater voltage value from maximum input voltage U1 and maximum output voltage U2 of the bidirectional flyback converter circuit.

For a flow of energy or power from the primary to the secondary side, i.e., when the primary-side switching element SE1 is switching, when the primary-side switching element SE1 is switched off, energy stored in a stray inductance of the transformer is loaded via the first diode D1 into the charge capacitor C3. Here, after a few clock cycles, the charge capacitor C3 will be charged up to the predeterminable value of the voltage U3 present at the charge capacitor C3. If this predeterminable value of the voltage U3 is reached or exceeded, then the switching element SE3 of the buck converter TS arranged on the input side begins to switch. The energy stored in the charge capacitor C3 is fed back by this via the buck converter TS arranged on the input side into an intermediate circuit or to the voltage input of the bidirectional flyback converter circuit. There this energy can be used, e.g., in order to reduce the input power of the bidirectional flyback converter delivered by the input voltage U1 or, e.g., to feed an auxiliary supply set up against the common potential M of primary and secondary side. The switching element SE3 is switched until such time as the predeterminable value of the voltage present at the charge capacitor C3 is no longer reached or is no longer exceeded. This means that the buck converter TS works as a controller (e.g., proportional controller) to keep the voltage present at the charge capacitor C3 to the predeterminable value.

For a flow of energy or power from the secondary side to the primary side of the bidirectional flyback converter circuit (i.e., when the secondary-side switching element SE2 is switching) when the secondary-side switching element SE2 is switched off, the energy stored in a stray inductance of the transformer is loaded via the second diode D2 into the charge capacitor C3. If the voltage U3 present at the charge capacitor C3 reaches the predeterminable value after a few clock cycles, then the switching element SE3 of the buck converter TS arranged on the input side begins to switch again, until the predeterminable value of the voltage present at the charge capacitor C3 is no longer reached or is no longer exceeded. The stored energy is also fed back in this case via the buck converter TS arranged on the input side, which again operates as a controller (e.g., as a proportional controller) and regulates the voltage at the charge capacitor C3 to the predeterminable value, into the intermediate circuit or to the voltage input, e.g., for a further use.

Figure 2:
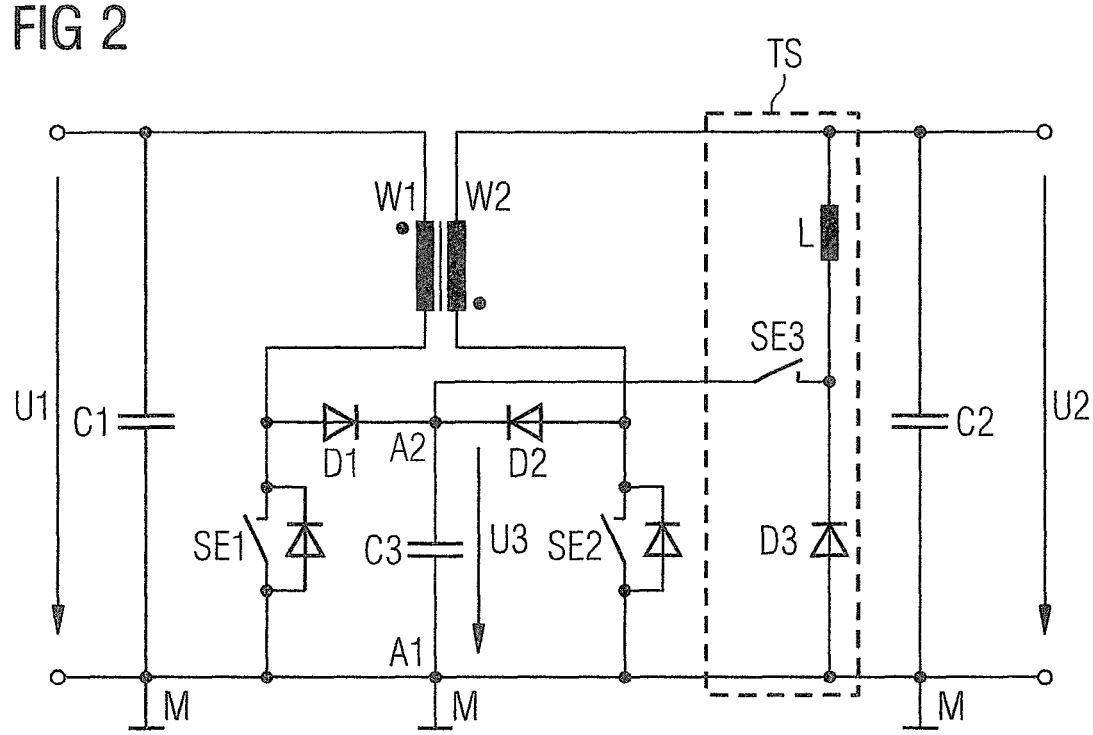
FIG. 2 is a schematic illustration of an exemplary bidirectional flyback converter circuit in accordance with an alternate embodiment of the invention.

As an alternative, the buck converter TS can also be arranged on at the output side at the bidirectional flyback converter circuit. A form of embodiment of the inventive flyback converter circuit of this type is shown schematically and by way of example in FIG. 2. The bidirectional flyback converter circuit shown in FIG. 2 largely corresponds in this case to the flyback converter circuit shown in FIG. 1, but has the buck converter TS arranged on the output side, however. In this case, the buck converter TS likewise comprises at least the inductance L, the third diode D3 and a switching element SE3, via which a connection exists to the second terminal A2 of the charge capacitor C3 or to the voltage U3 present at the charge capacitor C3. When the respective switching element SE1, SE2 of the bidirectional flyback converter circuit switching at the time is switched off, the energy stored in the stray inductance of the transformer is again either loaded via the first or the second diode D1, D2 into the charge capacitor C3, until the voltage U3 present at the charge capacitor C3 has reached or exceeded the predeterminable value. The switching element SE3 of the buck converter TS arranged on the output side begins to switch, until the predeterminable value of the voltage present at the charge capacitor C3 is no longer reached or is no longer exceeded. With an output-side arrangement of the buck converter TS, the energy stored in the stray inductance is fed back, however, via the buck converter TS into the intermediate circuit in the direction of the voltage output or is fed back to the voltage output, in order to be used there (e.g., for an auxiliary supply, etc.).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bidirectional flyback converter circuit comprising:
   a transformer with inductively coupled primary and secondary windings, the primary winding being connected to a voltage input of the bidirectional flyback converter circuit and the secondary winding being connected to a voltage output of the bidirectional flyback converter circuit;
   a primary-side switching element arranged in series with the primary winding;
   a secondary-side switching element arranged in series with the secondary winding;
   a charge capacitor which is connected via a first terminal to a common potential of a primary and secondary sides of the transformer, and which is connected by a second terminal via a first diode to a common potential of the primary-side switching element and primary winding and is further connected via a second diode to a common potential of the secondary-side switching element and secondary winding; and
   a buck converter connected to the second terminal and arranged on one of an input side and an output side of the bidirectional flyback converter circuit, said buck converter regulating a voltage present at said charge capacitor to a predeterminable value.

2. The bidirectional flyback converter circuit as claimed in claim 1, wherein the predeterminable value for the voltage present at the charge capacitor is definable in a predeterminable ratio to a greater voltage in each case from a maximum input voltage and a maximum output voltage of the flyback converter circuit.

3. The bidirectional flyback converter circuit as claimed in claim 2, wherein the predeterminable value for the voltage present at the charge capacitor has a value of at least twice a respective voltage value from the maximum input voltage and maximum output voltage of the flyback converter circuit.

4. The bidirectional flyback converter circuit as claimed in claim 1, wherein the primary-side switching element and the secondary-side switching element comprise Metal-Oxide Semiconductor Field Effect Transistors.

5. The bidirectional flyback converter circuit as claimed in claim 1, wherein the buck converter arranged on one of the input side and the output side of the bidirectional flyback converter circuit comprises at least one inductance, a third diode and a switching element.

6. The bidirectional flyback converter circuit as claimed in claim 5, wherein the switching element of the buck converter comprises a Metal-Oxide Semiconductor Field Effect Transistor.

7. The bidirectional flyback converter circuit as claimed in claim 5, wherein the switching element of the buck converter comprises a bipolar transistor.

8. The bidirectional flyback converter circuit as claimed in claim 5, wherein the switching element of the buck converter comprises an integrated component including a control, a driver and a switching element functionality.

9. The bidirectional flyback converter circuit as claimed in claim 5, wherein the primary-side and secondary-side switching elements and the switching element of the buck converter comprise gallium nitride based semiconductor switches.

10. The bidirectional flyback converter circuit as claimed in claim 1, wherein a surplus energy, which is left over at the buck converter arranged on one of the input side and output side of the bidirectional flyback converter circuit is feedable into a voltage other than one of an input voltage an output voltage of the flyback converter.

* * * * *